United States Patent [19]

Elsbett et al.

[11] 4,129,108

[45] Dec. 12, 1978

[54] PISTON FOR INTERNAL COMBUSTION ENGINES

[76] Inventors: Ludwig Elsbett; Günter Elsbett, both of Industriestrasse 14, D8543 Hilpoltstein, Fed. Rep. of Germany

[21] Appl. No.: 728,165

[22] Filed: Sep. 30, 1976

[30] Foreign Application Priority Data

Sep. 30, 1975 [DE] Fed. Rep. of Germany ....... 2543478

[51] Int. Cl.² .............................................. F01P 1/04
[52] U.S. Cl. .............................. 123/193 P; 123/41.35
[58] Field of Search .............. 123/193 P, 41.35, 41.37; 92/158, 159, 189

[56] References Cited

U.S. PATENT DOCUMENTS

| | | | |
|---|---|---|---|
| 1,231,901 | 7/1917 | Jones | 123/193 P |
| 1,289,953 | 12/1918 | Suplee | 123/41.35 |
| 2,800,119 | 7/1957 | Schmidl | 123/41.35 |
| 3,189,010 | 6/1965 | Isley | 123/41.35 |
| 4,056,044 | 1/1977 | Kamman et al. | 123/41.35 |

*Primary Examiner*—Charles J. Myhre
*Assistant Examiner*—Craig R. Feinberg
*Attorney, Agent, or Firm*—Walter Becker

[57] ABSTRACT

A piston for internal combustion engines, especially Diesel engines, which is equipped with a mantle connecting the piston head with the piston foot and which by means of this foot is pivotally connected to a gudgeon pin bearing of a connecting rod. Within the region of the gudgeon pin bearing there is provided at least one guiding surface for a coolant and/or lubricant sprayed from a crankcase chamber of the internal combustion engine against the piston. The coolant and/or lubricant are directed relative to the gudgeon pin bearing in such a way that the coolant and/or the lubricant carry out a flow around the gudgeon pin bearing while simultaneously flowing against the foot of the piston as well as against the gudgeon pin bearing.

10 Claims, 4 Drawing Figures

PISTON FOR INTERNAL COMBUSTION ENGINES

The present invention relates to a piston for internal combustion engines, especially Diesel engines which piston comprises a mantle connecting the head of the piston with a foot thereof and by means of said foot is pivotally connected to a gudgeon pin bearing of a connecting rod.

When designing in particular modern internal combustion engines such as Diesel engines with direct injection of the fuel into the combustion chamber, it is known that a better combustion of the fuel-air mixture will be possible in particular when in addition to a good filling of the combustion chamber with sufficient combustion air, among others also a tempering of the combustion chamber is so effected that the combustion chamber can within the region of the opening of the combustion chamber be heated up to a considerably greater extent than within the region of the bottom of the combustion chamber. For realizing such tempering it is possible within the region of the opening of the combustion chamber to provide thermal insulating substances between the combustion chamber and the mantle of the piston, and to see to it that within the region of the bottom of the combustion chamber the heat is withdrawn by means of a coolant for instance in the form of an injection oil.

A heretofore known piston for internal combustion engines of the type involved is at its piston head provided with a preferably rotation-symmetric and primarily ball-shaped combustion chamber which piston comprises thermal insulating means which are arranged between said piston and a mantle supporting a so-called ring support, which thermal insulating means insulate said combustion chamber relative to said ring support. The thermal insulating means which in this instance are designed as an insert contributing to the shaping of the internal combustion chamber are rolled onto the piston and mantle for the piston and are connected thereto in this way. This insert may, however, also be designed as a so-called glow part which constricts the opening of the combustion chamber. That portion of the piston mantle which faces away from the ring support is designed as a piston foot which piston foot is through a pivot bolt pivotally connected to a bolt bearing. The ring support which with this piston may preferably have only a very short skirt supports only the piston rings which seal said ring support with regard to the cylinder wall. The piston itself is supported against the cylinder by a slide shoe which is likewise pivotally connected to the bolt bearing and takes over the normal forces. The withdrawal of the heat generated by the combustion of the fuel-air mixture is effected primarily through the intervention of the piston foot, the gudgeon pin bearing and the slide shoe on the cylinder and is conveyed into the cooling system of the internal combustion engine. Tests with the pistons of this type have shown that a better and faster withdrawal of the heat would be desirable, especially with high load internal combustion engines (see German Auslegeschrift No. 1576013). In order to meet such requirement for a faster withdrawal of the heat, it is known in connection with similar pistons to spray the piston mantle provided between the ring support and the piston foot, by means of a cooling oil and to withdraw said cooling oil through a nozzle which is arranged within the region of the crankcase chamber. For a better cooling of such mantle, it is known to divide into two parts or strands the cooling oil sheet of the nozzle which is directed against the piston, and to do so by means of an annular tear-off edge provided on the mantle. Of these two strands, one strand leads into a recess between the ring support and the mantle, whereas the other strand or part extends along the mantle into the piston foot. It has been found that with this piston such a general cooling of the entire piston counteracts a tempering of its combustion chamber and more specifically in a hot and a so-called cool combustion part, and that in additon thereto it is frequently not possible fast enough to withdraw the heat from the piston foot and the gudgeon pin bearing by means of said cooling oil flow (see German Pat. No. 2007801).

It is, therefore, an object of the present invention so to improve a piston for internal combustion engines that it will be possible by simple means to design the combustion chamber of the piston in conformity with a desired heat diagram with a hot region at the opening of the combustion chamber and with a so-called cold region at the bottom of the combustion chamber and the gudgeon pin bearing.

These and other objects and advantages of the invention will appear more clearly from the following specification in connection with the accompanying drawings, in which.

Figure 1:
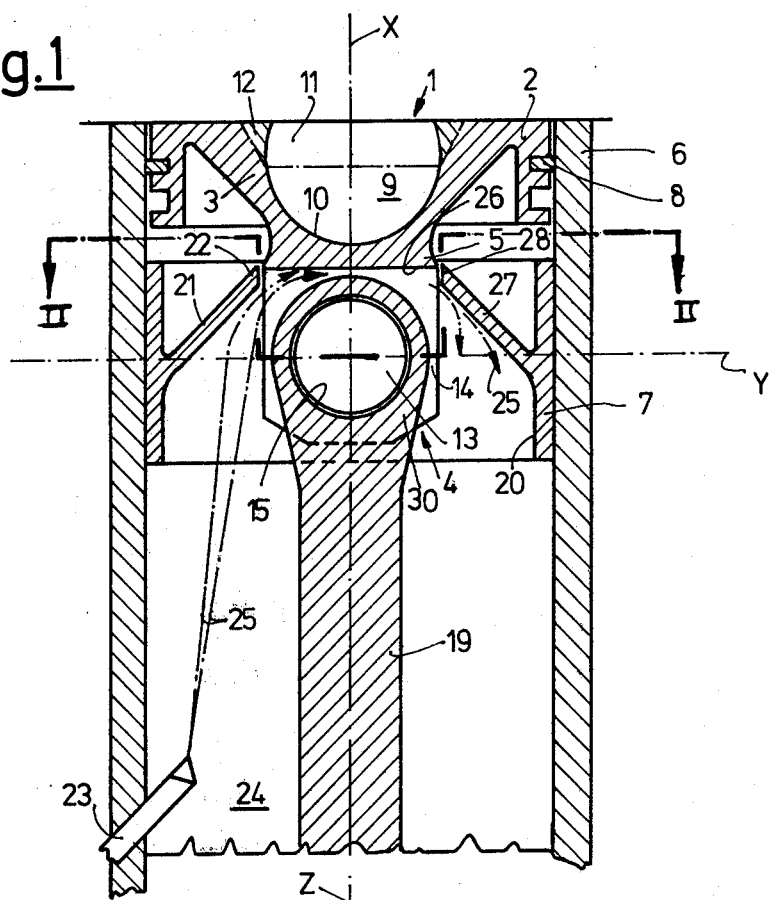
FIG. 1 represents a longitudinal central section through a cylinder of an internal combustion engine with a piston axially movable in said cylinder.

The piston according to the present invention is characterized primarily in that within the region of the gudgeon pin bearing there is provided at least one guiding surface for a coolant and/or lubricant which is sprayed from a crankcase chamber of the internal combustion engine against the piston. This coolant or lubricant is so directed toward the gudgeon pin bearing that the coolant and/or lubricant flows around the gudgeon pin bearing while simultaneously flowing onto the foot of the piston as well as onto the gudgeon pin of the gudgeon pin bearing.

These features take into consideration in an optimum manner the desired differentiated tempering of the combustion chamber as a result of which in addition to a substantially complete combustion of the fuel-air mixture, also the generation of the harmful waste gas emissions can be reduced. By discharging the heat through the bottom of the combustion chamber, the piston foot up to the slide shoe and from there through the cylinder into the cooling system of the internal combustion engine, not only the piston rings provided on the ring support are relieved from temperature influences, but the heat will also be faster withdrawn from the endangered piston parts because these areas have greater heat transfer surfaces. In addition thereto it should be noted that a portion of the heat is discharged through the spray oil also directly or indirectly to the cooling oil whereby the cooling effect is greatly increased. A further advantage of the invention is seen in the fact that by conveying the coolant and/or spray oil to the gudgeon pin bearing, the latter is not only cooled but is also reliably lubricated, which in turn greatly increases the useful lifespan of the piston and consequently also of the internal combustion engine.

An advantageous further development of the invention consists in that symmetrically with regard to the bearing for the connecting rod, the mantle surface of the slide shoe is respectively provided with a guiding surface and guiding rib.

Such an arrangement of guiding surfaces and guiding ribs makes it possible to convey the spray or cooling oil to the gudgeon pin bearing in a reliable manner and also to catch said spray and cooling oil after effected cooling of the respective parts to be cooled and to return said oil into the cooling system of the spray and cooling oil for instance into the oil pan.

In order to be able safely to convey the spray and cooling oil to the areas to be cooled and lubricated and to withdraw said oil again from these areas, it is possible according to a further feature of the invention to design the guiding surfaces and guiding ribs so that the free rim of said guiding surface or guiding ribs extend approximately up to the gudgeon pin bearing pin bearing.

A further advantageous development of the invention consists in that each guiding surface and guiding rib is so arranged in a flow favoring manner on the mantle surface of the sliding shoe, that also during the phase of the piston immerging into the cylinder or crankcase chamber, in particular the feeding of the spray and/or cooling oil to the gudgeon pin bearing will be retained.

In this way, it will be assured that independently of the stroke of the piston the latter will be sufficiently cooled and its parts to be lubricated will receive the necessary oil.

In order to be able to design the slide shoe that it can be easily manufactured, the slide shoe may be characterized in that for instance when employing only one guiding surface or guiding rib, the guiding surface or guiding rib will be curved in a bowl-shaped manner around said gudgeon pin bearing.

Such a design of the slide shoe will in addition to its simple manufacturing possibility have the advantage that due to the shielding or screening also of the cylinder wall sections located in the axial direction of said gudgeon pin of the gudgeon pin bearing, the spraying and/or cooling oil is kept away not only from said wall surfaces or wall sections, but that said spray or cooling oil is returned in a better aimed manner to the cooling and lubricating system of the internal combustion engine for instance to the oil pan.

In particular, with pistons having a large diameter as they prevail for instance with high-power internal combustion engines, it may occur that in spite of the above mentioned guiding surface or guiding rib within the region of the gudgeon pin bearing, the jet of the cooling and/or lubricating oil hardly reaches the entire surfaces on the gudgeon pin bearing and/or piston foot to be acted upon so that as a result thereof at certain areas critical temperatures may occur on said portions or sections. In order to counter or avoid such loads at the above mentioned areas in an effective manner, the guiding surface is according to a further feature of the invention arranged on a slide shoe which is pivotally connected to the gudgeon pin bearing, and the guiding surface has its free rim extending approximately to the gudgeon pin bearing.

In order to be sure that the cooling and/or lubricant can safely reach the bearing areas of the gudgeon pin on the slide shoe, it is provided according to the invention that the foot areas of these declining surfaces extend at least up to the bearing areas of the pivot bolt on the slide shoe.

Figure 2:
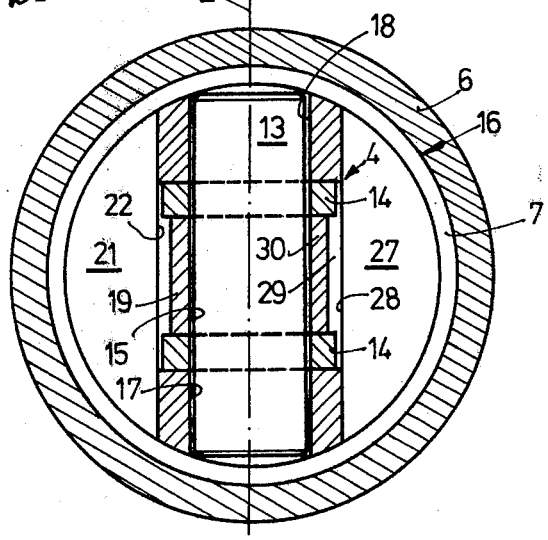
FIG. 2 represents a cross section through the cylinder and piston, said section being taken along the line II—II of FIG. 1.

Referring now to the drawings in detail, and in particular to FIGS. 1 and 2, the piston 1 illustrated therein and intended for internal combustion engines such as Diesel engines comprises primarily a piston head designed as ring support 2, and a mantle 3 supporting said ring support 2 and provided with a piston foot 5 ending in a gudgeon pin bearing 4. The piston 1 furthermore comprises a slide shoe 7 which guides the ring support 2 in a cylinder 6 and absorbs the normal forces from the working cycle of the piston, said slide shoe 7 likewise being journalled on the gudgeon pin bearing. The piston head which in the specific showing in the drawing is rather narrow and is equipped only with a mantle surface necessary for receiving piston rings 8, seals the ring support 2 with regard to the cylinder 6, and is preferably in its central portion provided with a rotation-symmetric combustion chamber 9 which in this instance for the sake of safety is designed in the form of a ball. The bottom 10 of said combustion chamber 9 extends far into the piston foot 5, and its remaining chamber 11 may be insulated relative to the mantle 3 of piston 1 by means of heat insulating means 12, diagrammatically only shown in the drawing. The piston foot 5 which in the gudgeon pin bearing 4 similar to the sliding shoe 7 is held by a pivot bolt 13 may be designed in particular as a fork 14 with bearing eyes 15 for the pivot pin. The slide shoe itself may be cup or bowl shaped and may have a closed mantle 16, or it may be designed as a spider which has its ends provided with sliding jaws (not shown in the drawing).

According to the embodiment of the slide shoe 7 in FIGS. 1 and 2, the slide shoe has a cup-shaped form and within the region of the longitudinal axis Z of the pivot bolt 13 has at least one bearing eye 17, 18 which at the end of a connecting rod 19 rests on the pivot bolt or joint bolt 13 of the gudgeon pin bearing 4. In addition to the bearing eye 17, 18 the slide shoe 7 is between its inner mantle 20 and the gudgeon pin bearing 4 provided with at least one guiding surface, preferably in the form of guiding rib 21. This guiding surface or guiding rib is arranged on the inner mantle of the slide shoe and has its free rim 22 pointing toward the gudgeon pin bearing 4. This guiding rib 21 is so arranged on the inner mantle 20 of the slide shoe 7 that it is able to catch a coolant and/or lubricant for instance an oil 25 which by means of a nozzle 23 is sprayed out of the crankcase chamber 24 against the piston 1. Said guiding rib 21 is further able by means of its guiding surface directed to the piston foot to pass said oil around the gudgeon pin bearing 4. This passing around of the oil 25 is so effected that a portion of the oil can reach the base 26 of the piston while a further portion can pass into the gudgeon pin bearing 4 and thereby also to the joint pivot 13. As a result thereof, on one hand the bottom 10 of the combustion chamber 9, i.e. the lower portion of the combustion chamber, and thereby also the piston foot 5, and on the other hand the works 14 of the joint pins 13 and naturally also the gudgeon pin bearing 4 can be sufficiently provided with oil 25 and thus can be cooled and lubricated. In order to be able to return to its starting point said spray and/or cooling medium in other words the oil 25 after the cooling and lubrication of the above mentioned parts has been effected, in the specific example, a second guiding rib 27 is symmetrically to the gudgeon pin bearing 4 arranged on the inner mantle 20 of the slide shoe 7. The free rim 28 of said second guiding rib 27 extends to the gudgeon pin bearing 4 in order in this way to catch the oil 25 leaving said last mentioned bearing and to return said oil into the lubricating system of the internal combustion engine, for instance to the oil pan. The inclination of said second guiding rib 27 may be the same as with the above mentioned first guiding rib 21, but it is also possible respectively to provide the guiding ribs 21 and 27 with different inclinations and if desired with other flow favoring, for instance blade-like forms. In order to make sure that also the spraying and/or cooling medium, in other words the oil 25 will safely reach the piston parts to be cooled and lubricated, the oil jet 25 leaving the nozzle 23 is relative to the longitudinal central axis X of the cylinder 6 or relative to the non-illustrated engine axis inclined to such an extent that during the downward or upward stroke of the piston 1, the oil 25 will move off over the entire or nearly entire guiding surface of the first guiding rib 21. In an analagous manner, the second guiding rib 27 may be so arranged that it will return the oil 25 to the oil pan not shown in the drawing. This design of the guiding ribs 21, 27 will also prevent that too much or too unilateral spray and/or cooling medium — in other words the oil 25 — passes to the piston foot 5 whereby the true roundness of the sealing mantle of piston 1 could be affected. With the embodiment illustrated in FIGS. 1 and 2, a slide shoe 7 is employed which is cup-shaped and the mantle 16 of which which is slidingly guided on the cylinder 6 moves around the gudgeon pin bearing 4. With this embodiment of the slide shoe 7, the guiding ribs 21, 28 in an arced manner extend to the gudgeon pin 4 without touching the latter. However, it would also be possible to design the slide shoe 7 only as a spider which passes through the gudgeon pin bearing 4 within the region of a transverse plane Y extending through said bearing. This spider would have sliding jaws arranged at its free ends. Furthermore, the said spider as well as the cylindrical slide shoe 7 could be pivotally connected to the gudgeon pin bearing 4. It would also be possible to design the sliding ribs 21, 27 in the form of a bowl, and to arc this bowl over the entire gudgeon pin bearing 4. Furthermore, the bottom of said bowl, which bottom extends around the gudgeon pin bearing 4 could be provided with recesses 29 for the forks 14, 13 of the piston foot 5 and the connecting rod 19 could be associated with said bowl. The connection of the guiding rib or guiding ribs 21, 27 to the inner mantle 20 of the slide shoe 7 may, similar to the embodiment of FIGS. 1 and 2, be effected within the region of a belt line which in this instance coincides with the transverse central plane 4 of the slide shoe 7 or extends therebelow or if desired may also extend thereabove.

Figure 3:
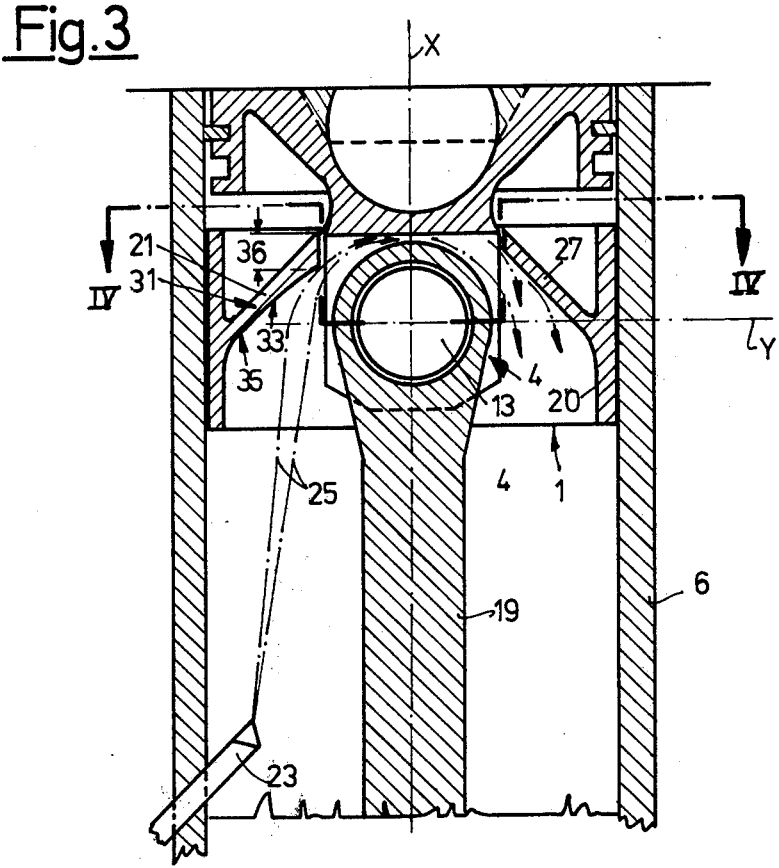
FIG. 3 represents a longitudinal central section through a cylinder of an internal combustion engine with a piston axially movable in said cylinder and a guiding surface having a hill-shaped elevation.
Figure 4:
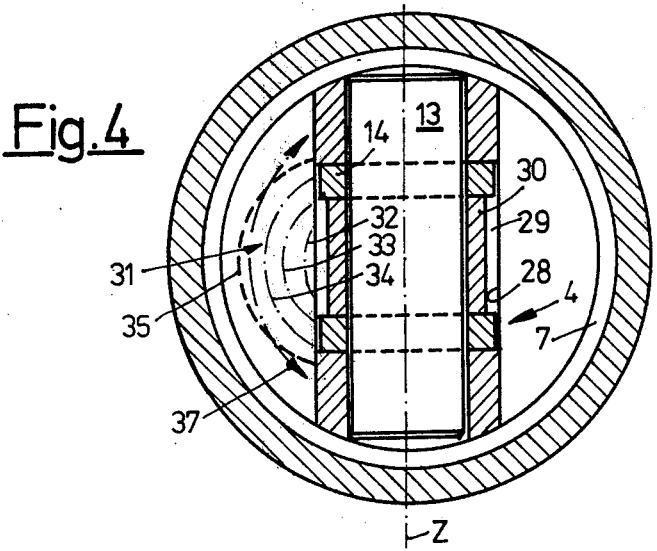
FIG. 4 is a cross section through the cylinder and piston, said cross section being taken along the line IV—IV of FIG. 3.

The embodiment according to FIGS. 3 and 4 differs from that of FIGS. 1 and 2 primarily in that with the embodiment of FIGS. 3 and 4 at least one of the guiding ribs 21, 27 arranged on the slide shoe 7, namely the guide rib 21 which is first acted upon by oil 25, is provided with a hill-shaped elevation 31. This elevation 31 which faces the jet of the oil 25 has differently extending height sections 32-35 of which the height section 32 adjacent the rim 22 of the guiding rib 21 is higher than the subsequent height section 33-35. The term "higher" is intended to designate the largest cross sectional surface 36 of the guiding rib 21. From this elevation, i.e. the cross sectional surface 36, the elevation 31 drops in radial as well as in axial direction which means in the longitudinal and transverse direction of the joint bolt 13 until the elevation has reached its foot or height section 35. The height sections 33-35 illustrated in FIG. 4 extend primarily circularly but it is also possible to design these height sections differently so that they are trough-shaped or blade-shaped with a maximum elevation instead of in the center of the elevation 31 on the rim. Important for the design of the elevation 31 is its function which consists in distributing the oil 25 along the longitudinal axis Z of the joint bolt 13.

It is, of course, to be understood that the present invention is, by no means, limited to the specific showing in the drawings, but also comprises any modifications within the scope of the appended claims.

What we claim is:

1. A piston for internal combustion engines, especially Diesel engines, which includes in combination: a piston head portion for receiving and supporting piston rings, a gudgeon pin, a mantle connected to said head portion and forming a foot portion with bearing means supporting said gudgeon pin, slide shoe means pivotally supported by said gudgeon pin and provided with at least one guiding surface directed from said slide shoe means inwardly and at an incline with regard to the piston axis and in the direction toward said mantle for directing a coolant and lubricant sprayed into said piston to flow both against said foot portion of said piston and also around the bearing means for said gudgeon pin and against the latter, each of said guiding surfaces having a free edge nearly extend to said bearing means for said gudgeon pin, each of said guiding surfaces being formed by a mantle surface section of said slide shoe means, each guiding surface being connected to an inner wall side of said slide shoe means within the region of a plane passing through the axis of said gudgeon pin and at a right angle to the piston axis.

2. A piston in combination according to claim 1, which includes a connecting rod pivotally connected to said gudgeon pin, and in which said guiding surfaces form one single part and in a roof-shaped manner extend over said bearing for said gudgeon pin while being provided with bearing eyes for journalling said gudgeon pin, said guiding surface also having cut-outs for the forks of said foot portion of said piston and for the fork of said connecting rod.

3. A piston in combination to claim 1, in which said at least one guiding surface is provided with a blade-like configuration having outwardly located elevations.

4. A piston for internal combustion engines, especially Diesel engines, which includes in combination: a piston head portion for receiving and supporting piston rings, a gudgeon pin, a mantle connected to said head portion and forming a foot portion with bearing means supporting said gudgeon pin, slide shoe means pivotally supported by said gudgeon pin and provided with at least one guiding surface directed from said slide shoe means inwardly and at an incline with regard to the piston axis and in the direction toward said mantle for directing a coolant and lubricant sprayed into said piston to flow both against said foot portion of said piston and also around the bearing means for said gudgeon pin and against the latter, said slide shoe means includes two guiding surfaces respectively arranged on opposite sides of said piston axis and substantially symmetrically with regard thereto, said guiding surfaces forming part of roof-shaped ribs of said slide shoe means, each of said guiding surfaces being formed by a mantle surface section of said slide shoe means, each guiding surface being connected to an inner wall side of said slide shoe means within the region of a plane passing through the axis of said gudgeon pin and at a right angle to the piston axis, also the roof shaped section of said guiding surfaces starting at said region of said plane passing through the axis of said gudgeon pin and a right angle to the piston axis.

5. A piston in combination according to claim 4, in which each of said guiding surfaces has a free edge nearly extend to said bearing means for said gudgeon pin.

6. A piston in combination according to claim 4, in which said slide shoe means includes two guiding surfaces respectively arranged on opposite sides of said piston axis and substantially symmetrically with regard thereto, said guiding surfaces forming part of roof-shaped ribs of said slide shoe means.

7. A piston in combination according to claim 6, in which each of said guiding surfaces is formed by a mantle surface section of said slide shoe means.

8. A piston in combination according to claim 6, in which one of said guiding surfaces is so directed as to lead coolant and lubricant to said bearing means, whereas the other one of said guiding surfaces is so directed as to lead coolant and lubricant in a direction out of said piston.

9. A piston in combination to claim 8, for alternately immersing into and emerging from an oil containing crankcase, in which at least that guiding surface for guiding coolant and lubricant to said bearing means when immersing into said crankcase guides the coolant and lubricant along the longitudinal axis of said gudgeon pin.

10. A piston in combination according to claim 9, in which at least the guide surface for feeding coolant and lubircant to said bearing for said gudgeon pin decreases in elevation from the free edge of said guiding rib toward the outer periphery of said slide shoe means.

* * * * *